(No Model.)  2 Sheets—Sheet 1.
T. J. JONES.
VOLTAIC BATTERY.
No. 358,120. Patented Feb. 22, 1887.
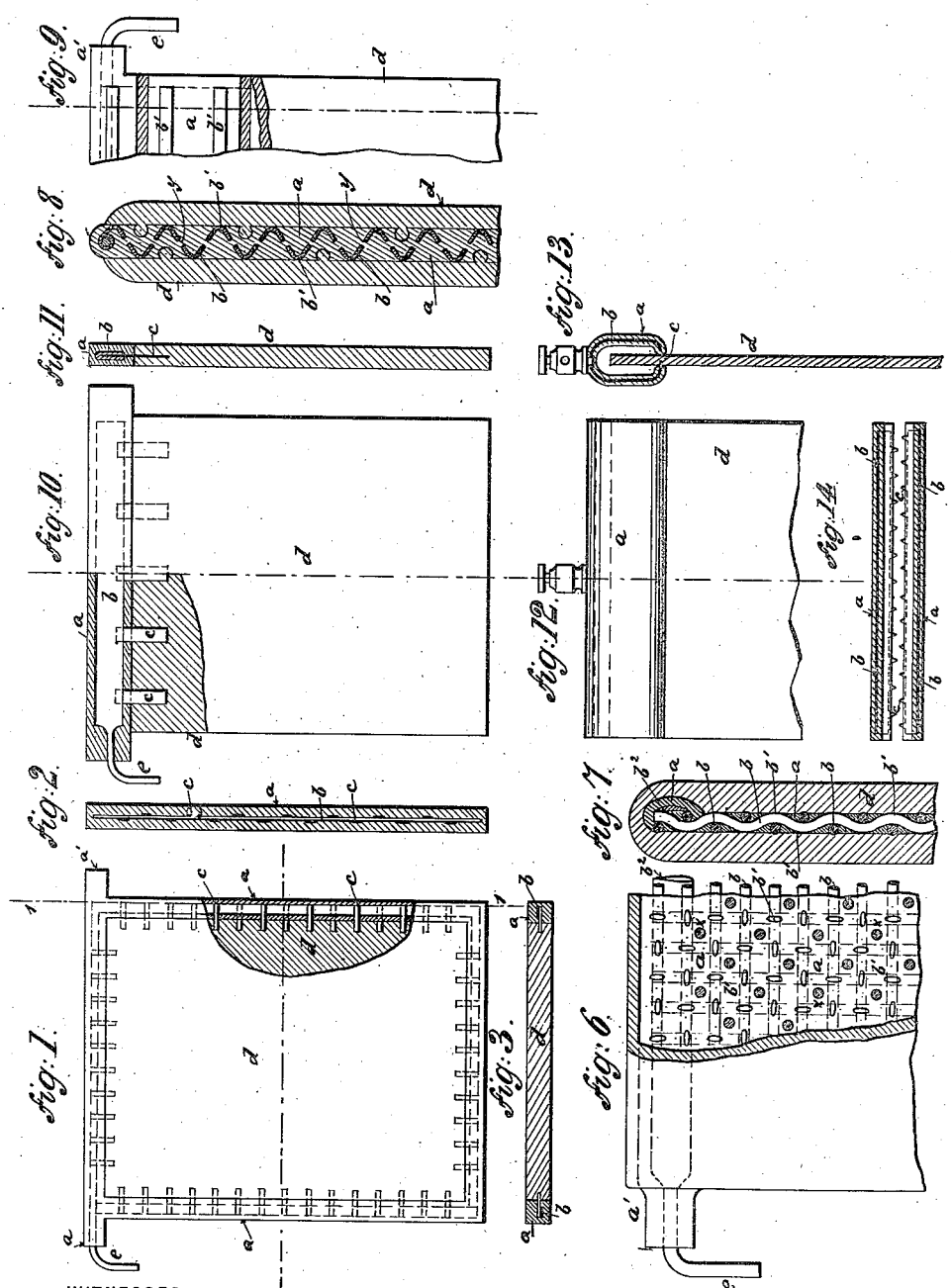
WITNESSES:
A. Schehl
Harry M. Turk
INVENTOR
Thos. John Jones
BY Briesen & Steele
ATTORNEYS (No Model.) 2 Sheets—Sheet 2.
T. J. JONES.
VOLTAIC BATTERY.
No. 358,120. Patented Feb. 22, 1887.
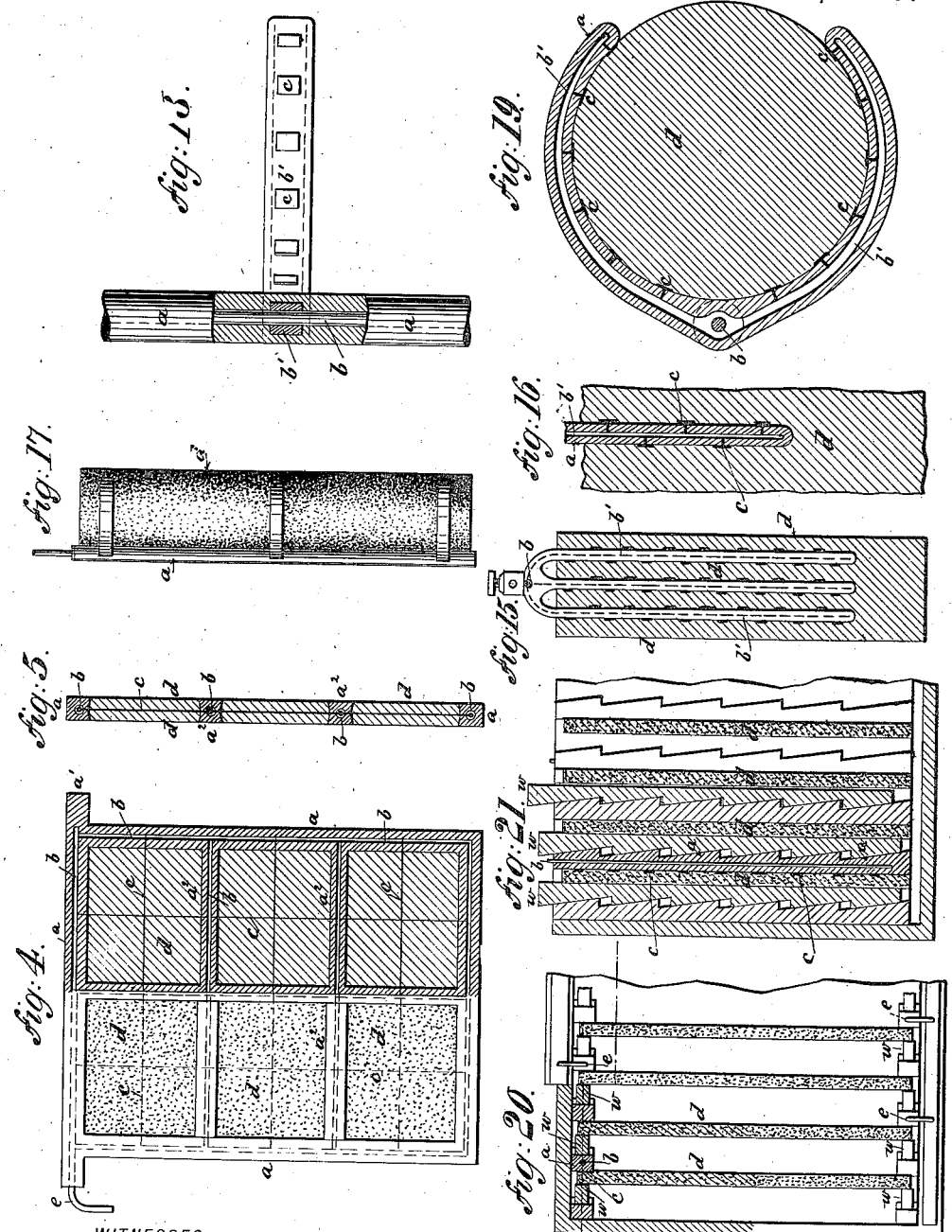
WITNESSES:
A. Schehl.
Harry M. Ink
INVENTOR
Thos. John Jones
BY Briesen & Steele
ATTORNEYS

UNITED STATES PATENT OFFICE.

THOMAS JOHN JONES, OF 12 PRINCES STREET, HANOVER SQUARE, COUNTY OF MIDDLESEX, ENGLAND, ASSIGNOR TO THE PRIMARY BATTERY COMPANY, (LIMITED,) OF SAME PLACE.

VOLTAIC BATTERY.

SPECIFICATION forming part of Letters Patent No. 358,120, dated February 22, 1887.

Application filed April 24, 1886. Serial No. 200,005. (No model.) Patented in England May 20, 1885, No. 6,555, and in France October 10, 1885, No. 171,599.

*To all whom it may concern:*

Be it known that I, THOMAS JOHN JONES, of 12 Princes Street, Hanover Square, in the county of Middlesex, England, electrician, have invented or discovered new and useful Improvements in Voltaic Batteries; and I do hereby declare the nature of the said invention, and in what manner the same is to be performed, to be particularly described and ascertained in and by the following statement thereof, and for which I have obtained Letters Patent in England, No. 6,555, dated May 20, 1885, and in France, No. 171,599, dated October 10, 1885.

My invention relates to improvements in primary and secondary batteries, being more particularly designed for the negative elements of lead batteries.

The object of my invention is to produce a voltaic battery free from liability, at those points where the active material makes contact with the conductor, to local action and consequent disintegration, and of comparatively inexpensive construction.

My invention consists in making those parts of a battery which serve to support and make contact with the active material of an insulating inoxidizable (or but slightly oxidizable) material, in embedding therein a conductor, and in putting the conductor into electrical connection with the active material of the element at several points by the intervention of gold or platinum, applied in such a way that I obtain all or nearly all the obvious advantages, as regards efficiency, of a support constructed wholly of these precious metals. I obtain these advantages at a tithe of the expense which has alone hitherto rendered the employment of these metals in the construction of voltaic batteries commercially impracticable.

The parts of the battery to which my invention applies are those which serve for the support of the active material *in situ* and for conducting the current, (whether such supports are constituted by frames or other structures placed loose within the cell, or by the walls of the cell itself,) and also those, such as the binding-pieces, terminals, or clamps, (whether integral with or made separate from the element,) which are used for making contact with the active material or element for the purpose of coupling up the different elements of the battery.

In carrying out my invention I employ as the insulating, inoxidizable, or but slightly oxidizable material india-rubber, gutta-percha, xylonite, celluloid, parkesine, and the like, or compounds containing these substances, and as the conductor I use wires or strips of a base metal—such as copper (or an alloy thereof) or other forms of conductive material—which I embed in the insulating material, the connection between the conductor and the active material being made, preferably, by leaving uncovered by the insulating material numerous relatively minute portions of the conductor, to which portions gold or platinum has been previously applied in the form of a non-porous film, covering, or coating, so as on the one hand to put the conductor into good electrical connection with the active material and on the other hand to effectually protect the conductor from direct contact either with the active material or the electrolyte, whereby the triple contact of the electrolyte, the active material, and the oxidizable conductor, which would result in the formation of a local couple, is avoided. The portions of the conductor thus protected may either be portions of the main conductor left exposed or small branches in the form of wires or strips connected to a main conductor and projecting through the inoxidizable support into or against the active material; or these branches may be of solid platinum or gold instead of being of base metal merely coated or tipped with either of these metals.

The support may be in the form of a frame, plate, mass, tray, or lattice, or it may be of zigzag, spiral, or other form, or in the form of a tang or tangs, &c., and the platinum or gold wires, strips, or points by which contact is made with the active material may (if necessary to increase the area of the conductive surface in contact with the active material) be connected together by a deposit or layer extending over the whole or any portion of the surface of the support, &c.

In the accompanying drawings various forms of the conductive supports and contact pieces or terminals are represented, the same principle of construction being common to all. I would, however, have it understood that I do not limit myself to the forms illustrated, as they may be modified without departing from my invention.

Figure 1 shows a face view, partly broken away, and Figs. 2 and 3 cross-sections on lines 1 1 and 2 2, Fig. 1, of an element having a support consisting of a rectangular frame, $a\,a$, of inoxidizable non-conducting material, with a conductor, $b$, embedded therein. The conductor, which may be a wire or flat strip of metal or carbon extending around the four sides of the frame, is in electrical contact with small branch wires or strips $c$, partly embedded in the insulating material $a$ and partly projecting therefrom at the inner sides, so as to penetrate the mass of the active material $d$, which is packed in the frame $a$, and, if necessary, supported therein by cross-bars or otherwise. These branch wires are soldered to the conductor $b$ (if the latter is of metal) or otherwise attached. If of base or oxidizable metal, the ends of these branch wires, points, or strips which are toward, or which project into, the active material should be electroplated with gold or platinum to a sufficient thickness to form a non-porous inoxidizable coating, which should be continued for a sufficient distance along their length to prevent all contact of the active material or the electrolyte with the base metal, or the branch wires may be of solid gold or platinum.

Figs. 4 and 5 show a somewhat similar construction of support, in which the frame of inoxidizable non-conducting material $a$ has cross-bars $a^2$, of the same material, dividing it into smaller compartments, the main conductor $b$ embedded therein extending throughout the main and cross bars of the frame, and platinum or gold wires $c$ being stretched entirely across the compartments of the frame, said wires being attached to the main conductor and in electrical contact therewith and with the active material $d$.

Fig. 6 shows a face view, on an enlarged scale, of an element having another form of support, the active material being partly broken away to show the conductive portion. Fig. 7 is a vertical section of the same element. The support in this case consists of a net-work of wires of base metal, $b$, interwoven, as shown, and constituting the main conductor embedded in the inoxidizable non-conducting material $a$, conductive contact being established between the active material $d$ and the conductor $b$ by leaving uncovered or by removing the insulating material from the portions $b'$ of the conductor $b$ which are nearest to the surface of the insulating mass, these exposed portions having been previously electroplated or coated with a non-porous film, deposit, or layer of platinum or gold. This network of wires is in electrical contact at the upper part with a terminal conductor, $b^2$, also embedded in the insulating material. The network of wires embedded in the non-conducting material is covered on both sides with active material. In order to hold the two layers of active material in place, the insulating material is preferably molded with holes $x$ passing through the interstices of the meshes and clear of the wires, into which holes the active material is forced, so as to unite the two layers of active material and key them to the support.

In Figs. 8 and 9 the conductor is in the form of a corrugated plate or sheet of metal, $b$, which is embedded in the insulating inoxidizable material $a$. The tops $b'$ of the corrugations are alone left uncovered by the insulating material, and these portions are coated with platinum or gold, as in the former case. The plate $b$ has rows of perforations $y$ along the flanks of the corrugations, through which the insulating material is forced, so as to hold the latter in close contact with the plate $b$; or any other means of obtaining this contact may be adopted. The active material may be held against the insulating material by means of undercut grooves in the latter, into which the active material is keyed.

In the whole of the above examples the ordinary binding-screws are dispensed with, the elements being provided with metallic tangs or projections $e$, which are formed in one with or are in electrical connection with the embedded conductor, and which are bent down so as to dip into a mercury-trough alongside of the cell, the element being supported in position in the cell by the projecting portions $a'$ of the insulating material resting on the two sides of the cell.

In Figs. 10 and 11 there is no conductive support, but only a piece which extends along the upper edge of the element and is designed to take the place of the ordinary clamp and binding-screw, and is especially adapted for use with an element composed of an agglomerated mass of active material having no internal support. This piece is similar in construction and equivalent to the top bar of the frame shown in Fig. 1, with its embedded conductor $b$ and branch strips $c$.

Figs. 12, 13, and 14 show a spring clip, clamp, or terminal for the element, consisting of a metallic strip, $b$, bent to the proper form and embedded in the insulating material $a$ and furnished with points $c$, which project from the surface of the gripping-jaws of the clip or clamp and are covered with platinum or gold, and which penetrate and make contact with the active material $d$. In this case the conductive strip is connected to a binding-screw for coupling up, in lieu of the tang dipping into mercury. In both these examples the element should be supported in the cell from below, to prevent it breaking away from the terminal or clamp.

In Figs. 15 and 16 the contact-piece consists of a main conducting-wire, $b$, provided with a number of branches, $b'$, all embedded in insulating inoxidizable material $a$, and ramifying through the active material $d$. To these branches $b'$ are attached contact-pieces $c$, of platinum or gold, which are in electrical contact with the active material and the branches $b'$.

Fig. 17 shows, in elevation, a contact-piece, which also acts as a support for a rod or cylindrical mass, $d$, of active material. Fig. 18 shows a part sectional elevation of a portion of the same, and Fig. 19 a cross-section thereof. It consists of a number of spring-clips adapted to embrace and make contact with the said rod or mass, these clips being constructed of strips or branches $b'$, of steel or other base metal, bent to the proper form and branching from a main conductor, $b$, of the same metal, to which they are soldered or otherwise attached, and the whole embedded in insulating material $a$. The branches are provided with contact-pieces $c$, of gold or platinum, which are in electrical contact with the active material and the branches $b'$.

In Figs. 20 and 21 each element makes contact along one of its vertical sides with platinum or gold contact-pieces $c$ of a conductor, $b$, embedded in a vertical rib of inoxidizable material molded in one with or fixed to the side of the cell. The elements are pressed tightly against the contacts $c$ and fixed in place in the cell by means of wedges $w$, of inoxidizable material, driven in between the elements and the next adjacent rib of the cell.

It is advisable to coat the parts of the oxidizable conductor (which are intended to be left uncovered by the inoxidizable material) with the platinum or gold before embedding the said conductor, and to extend the coating a sufficient distance so that it will be partly overlapped by the inoxidizable material, in order to avoid liability of leaving any part of the oxidizable conductor exposed to the electrolyte, which might occur if the gold or platinum were applied after embedding the conductor.

In order to obtain a non-porous layer of gold or platinum by electro-deposition, it is preferred to first apply to the portions to be plated a layer of gold or platinum leaf or foil, and to electro-deposit the same metal thereon.

The embedding of the conductor in the insulating material may generally be conveniently performed by molding the latter in halves, the line of division coinciding with the intended position of the conductor, and placing the conductor between adjacent surfaces of the halves while the latter are plastic, and uniting them by pressure and a solvent, if necessary. In all cases to obtain good electrical contact the platinum or gold should project from the surface of the inoxidizable material.

The invention is applicable to primary and also to secondary batteries and to both kinds of elements thereof.

Having now particularly described and ascertained the nature of my said invention and in what manner the same is to be performed, I declare that what I claim is—

1. In a galvanic element, a combined support and current conductor constructed of an insulating and inoxidizable material and of an oxidizable conductor made of base metal and having gold or platinum locally applied or connected thereto, the conductor being embedded in the insulating material with the exception of the gold or platinum portions, which alone make electrical contact between the elements and the oxidizable conductor, whereby all contact of the electrolyte or of the active material with the oxidizable conductor is prevented, as herein specified.

2. A galvanic element whereof the support for the active material is constructed of a framework of insulating and inoxidizable (or nearly inoxidizable) material having an oxidizable conductor of base metal embedded therein, and branch wires or strips connected to said conductor, said branch wires or strips projecting from the insulating material and penetrating the active material and being plated or coated with gold or platinum or made wholly of one or other of these metals, substantially as and for the purpose specified.

3. A galvanic element whereof the support for the active material is constructed of a corrugated and perforated plate of base metal partially plated or covered with gold or platinum and embedded in an insulating and inoxidizable (or nearly inoxidizable) material, the portions plated with gold or platinum alone making conductive contact with the active material of the element, substantially as herein specified, and shown in the drawings.

4. In a voltaic battery, the terminal or contact-piece consisting of a conductor of base metal wholly embedded in substantially inoxidizable material with the exception of its end and having gold or platinum applied to it at numerous points, so as to put the embedded conductor into electric connection with a large surface of the element, as specified.

The above specification of my invention signed by me this 9th day of April, 1886.

THOMAS JOHN JONES.

Witnesses:
B. E. KNIGHT,
3 *Charteris Road, Finsbury Park, London.*
J. E. S. BROWNE,
23 *Fleming Road, London, S. E.*